(12) United States Patent  (10) Patent No.: US 12,465,949 B2
Schweitzer  (45) Date of Patent: Nov. 11, 2025

(54) SONOTRODE HAVING OPTIMIZED SLOT GEOMETRY

(71) Applicant: HERRMANN ULTRASCHALLTECHNIK GMBH & CO. KG, Karlsbad (DE)

(72) Inventor: Matthias Schweitzer, Keltern (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 0 days.

(21) Appl. No.: 18/727,829

(22) PCT Filed: Jan. 9, 2023

(86) PCT No.: PCT/EP2023/050262
§ 371 (c)(1),
(2) Date: Jul. 10, 2024

(87) PCT Pub. No.: WO2023/135068
PCT Pub. Date: Jul. 20, 2023

(65) Prior Publication Data
US 2024/0416387 A1 Dec. 19, 2024

(30) Foreign Application Priority Data
Jan. 11, 2022 (DE) .......................... 102022100500.3

(51) Int. Cl.
B06B 3/00 (2006.01)
(52) U.S. Cl.
CPC ..................... B06B 3/00 (2013.01)

(58) Field of Classification Search
CPC ....................................................... B06B 3/00
See application file for complete search history.

(56) References Cited

U.S. PATENT DOCUMENTS

| 4,619,636 A | 10/1986 | Bogren |
| 6,947,697 B2 | 9/2005 | Fujimoto et al. |
| 2005/0028942 A1* | 2/2005 | Rabe ................ B29C 66/81427 156/580.2 |

(Continued)

FOREIGN PATENT DOCUMENTS

| DE | 2831240 A1 | 1/1980 |
| DE | 102017123011 A1 | 4/2019 |

(Continued)

Primary Examiner — Daniel McNally
(74) Attorney, Agent, or Firm — Hudak, Shunk & Farine Co. LPA

(57) ABSTRACT

An ultrasonic vibration element which vibrates with a longitudinal ultrasonic vibration, the vibration unit is bounded in the longitudinal direction by a rear face and a front face, the front face is either intended to come into contact with a further vibration element or is designed as a sealing surface or adjoins a sealing surface which comes into contact with a material to be processed, wherein a circumferential lateral surface is provided, which connects the rear surface and the front face, the vibration element has a slit in the lateral surface, the slit has a slit length, a slit width and a slit depth, the slit depth being selected such that the slit completely penetrates the ultrasonic element, and the slit length being greater than the slit width, wherein the slit is not axially symmetrical to a slit longitudinal axis.

20 Claims, 2 Drawing Sheets

A-A

(56) References Cited

U.S. PATENT DOCUMENTS

| | | | |
|---|---|---|---|
| 2005/0247408 A1* | 11/2005 | Jung | B06B 3/00 156/580.2 |
| 2006/0022016 A1* | 2/2006 | DeAngelis | B06B 3/00 228/1.1 |
| 2013/0008132 A1* | 1/2013 | Vogler | B29C 66/81431 310/334 |
| 2016/0001498 A1 | 1/2016 | Voegler et al. | |

FOREIGN PATENT DOCUMENTS

| | | | |
|---|---|---|---|
| EP | 2774746 B1 | 4/2017 | |
| EP | 1819506 B1 | 5/2017 | |
| GB | 998124 A | 7/1965 | |
| GB | 2344487 A * | 6/2000 | B06B 3/00 |

* cited by examiner

SONOTRODE HAVING OPTIMIZED SLOT GEOMETRY

FIELD OF THE INVENTION

The present invention relates to an ultrasonic vibration element which can be set into resonant vibration with a longitudinal ultrasonic vibration in a longitudinal direction, wherein the ultrasonic vibration unit is bounded in the longitudinal direction on the one hand by a rear face and on the other hand by a front face, wherein the front face is either intended to come into contact with a further ultrasonic vibration element in order to transmit the ultrasonic vibration to the further ultrasonic vibration element, or is designed as a sealing surface or adjoins to a sealing surface which is intended to come into contact with a further ultrasonic vibration element in order to transmit the ultrasonic vibration to the further ultrasonic vibration element.

BACKGROUND OF THE INVENTION

The ultrasonic vibration element usually has a circumferential lateral surface which connects the rear surface and the front face. Such an ultrasonic vibration element, which is designed as a sonotrode, is known from EP 2 774 746 B1. In this ultrasonic vibration element, the front face is designed as a sealing surface. The ultrasonic vibration element could also be designed as an amplitude transformer or as a converter.

As a rule, the sonotrode is a half-wave resonator, i.e. the entire length of the sonotrode along the longitudinal direction corresponds to half a wavelength of the resonant vibration of the sonotrode.

This ultrasonic vibration element has a series of slits in the lateral surface, the slits having a slit length l in a slit longitudinal direction, a slit width b in a slit transverse direction and a slit depth t in a slit depth direction, the slit longitudinal direction, the slit transverse direction and the slit depth direction being arranged orthogonally to one another and the slit depth t being selected such that the slit completely penetrates the ultrasonic element, and the slit length l being greater than the slit width b.

The slits are used, among other things, to reduce stresses occurring within the material due to excitation with a longitudinal ultrasonic vibration, making it possible to excite the sonotrode with a higher vibration amplitude. The vibration amplitude and the position of unwanted vibration modes can also be influenced by the dimensioning and positioning of the slits.

When dimensioning the slits, maximum permissible mechanical stress values within the material are often also taken into account. However, the introduction of slits usually leads to additional, undesirable vibration modes whose excitation frequencies should be as far away as possible from the excitation frequency of the main frequency intended for operation.

In the prior art, the disadvantages associated with an arrangement of the slits parallel to the longitudinal direction are described in detail. In EP 2 774 746 B1, the slits were therefore arranged at an angle to the longitudinal axis of the sonotrode.

SUMMARY OF THE INVENTION

Based on the described prior art, it is therefore the problem of the present invention to provide an alternative slit geometry and arrangement that meets the requirements for the maximum permissible mechanical stress values, has a high vibration amplitude and does not require slits inclined to the longitudinal axis of the sonotrode.

This problem is solved by the slit not being axially symmetrical to a slit longitudinal axis along the slit longitudinal direction in a sectional view.

In contrast to the known slits, the slit according to the invention is designed asymmetrically in relation to the slit longitudinal direction.

It is then not necessary to arrange the slit at an angle as in the prior art. Instead, the slit longitudinal direction and the longitudinal direction can include an angle that is less than 25°, preferably less than 5° and preferably 0°.

The desired vibration result is therefore achieved by the non-axisymmetric design of the slit.

In a preferred embodiment, two slits are provided, the two slits being arranged axially symmetrically to an axis along the longitudinal direction.

In a particularly preferred embodiment, four slits are provided, with two of the four slits being arranged axially symmetrically to an axis along the longitudinal direction.

Providing more than one slit improves the mechanical stresses in the ultrasonic vibration element. The position of unwanted secondary resonances is also improved.

In a preferred embodiment, the ultrasonic vibration element has a first, second and third section, wherein the first section has a thickness which is smaller than the thickness of the third section, wherein the second section has a varying thickness and connects the first section to the third section. The three sections are arranged one behind the other in the longitudinal direction.

The different thicknesses allow the amplitude of the ultrasonic vibration to be adjusted or increased. Therefore, the first section is preferably arranged so that it comprises the front face, while the third section comprises the rear face.

In a preferred embodiment, the first section has a sealing surface intended to come into contact with a material to be processed.

This ensures that when the ultrasonic vibration element is excited, the sealing surface has a comparatively large oscillation amplitude of the ultrasonic vibration.

In another preferred embodiment, the third section has a recess in which at least one piezo element is arranged. The ultrasonic vibration element is therefore very compact, whereby the vibration is generated within the ultrasonic vibration element with the aid of the piezo elements and can be transmitted through the ultrasonic vibration element to the material to be processed. This ultrasonic vibration element thus integrates the sonotrode, amplitude transformer and converter into a single element.

In a further preferred embodiment, it is provided that the slit is bounded by two longitudinal walls and two cross walls, a first of the two longitudinal walls being further away from the slit longitudinal axis, at least in sections, than a second of the two longitudinal axes. Basically, such a slit can be produced by first producing a slit with two parallel longitudinal walls and then making a recess in the first longitudinal wall.

Preferably, the first longitudinal wall is arranged further away from a longitudinal center axis of the ultrasonic vibration element than the second longitudinal wall.

As a result, the mechanical stresses within the ultrasonic vibration element could be further reduced. In a further preferred embodiment, the two cross walls are concavely curved, with the two cross walls preferably being curved with the same radius of curvature.

Furthermore, it is advantageous if the first longitudinal wall is designed to be concave in at least some sections.

BRIEF DESCRIPTION OF THE DRAWINGS

Further advantages, features and possible applications will become clear from the following description of a preferred embodiment and the associated figures.

It shows.

DETAILED DESCRIPTION OF THE INVENTION

Figure 1:
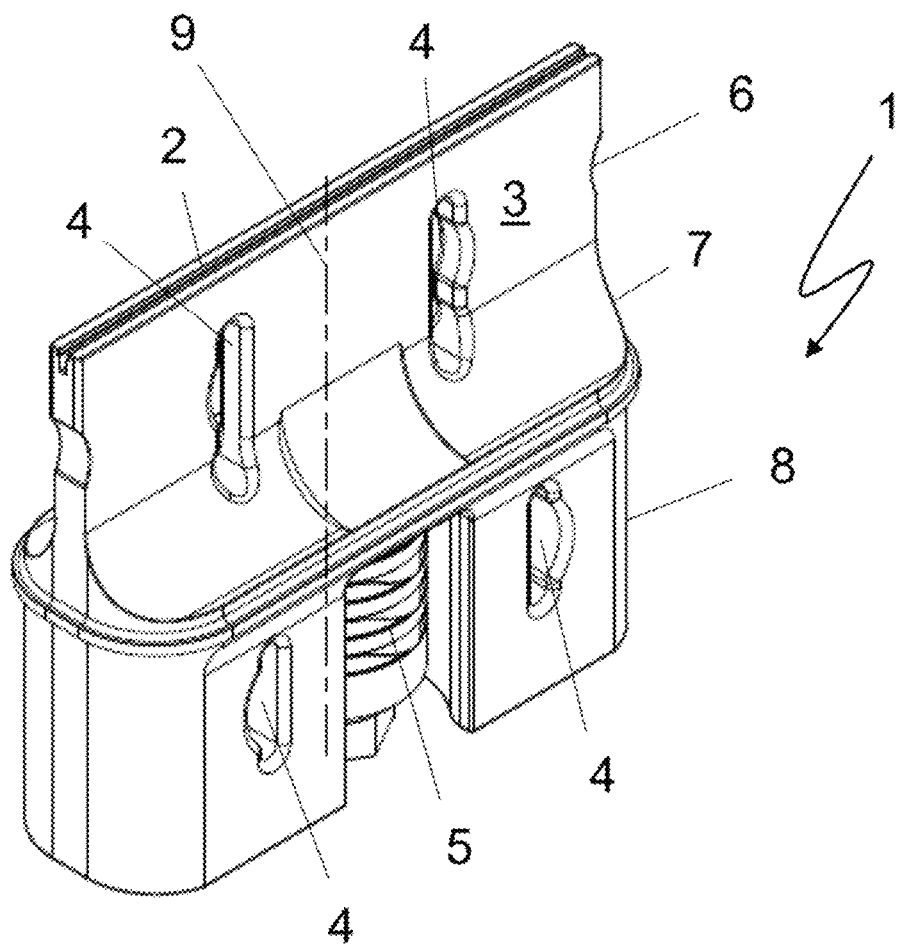
FIG. 1 a perspective view of an ultrasonic vibration element of the invention and FIG. 2 a partially sectioned plan view of the ultrasonic vibration element of FIG. 1.
Figure 2:
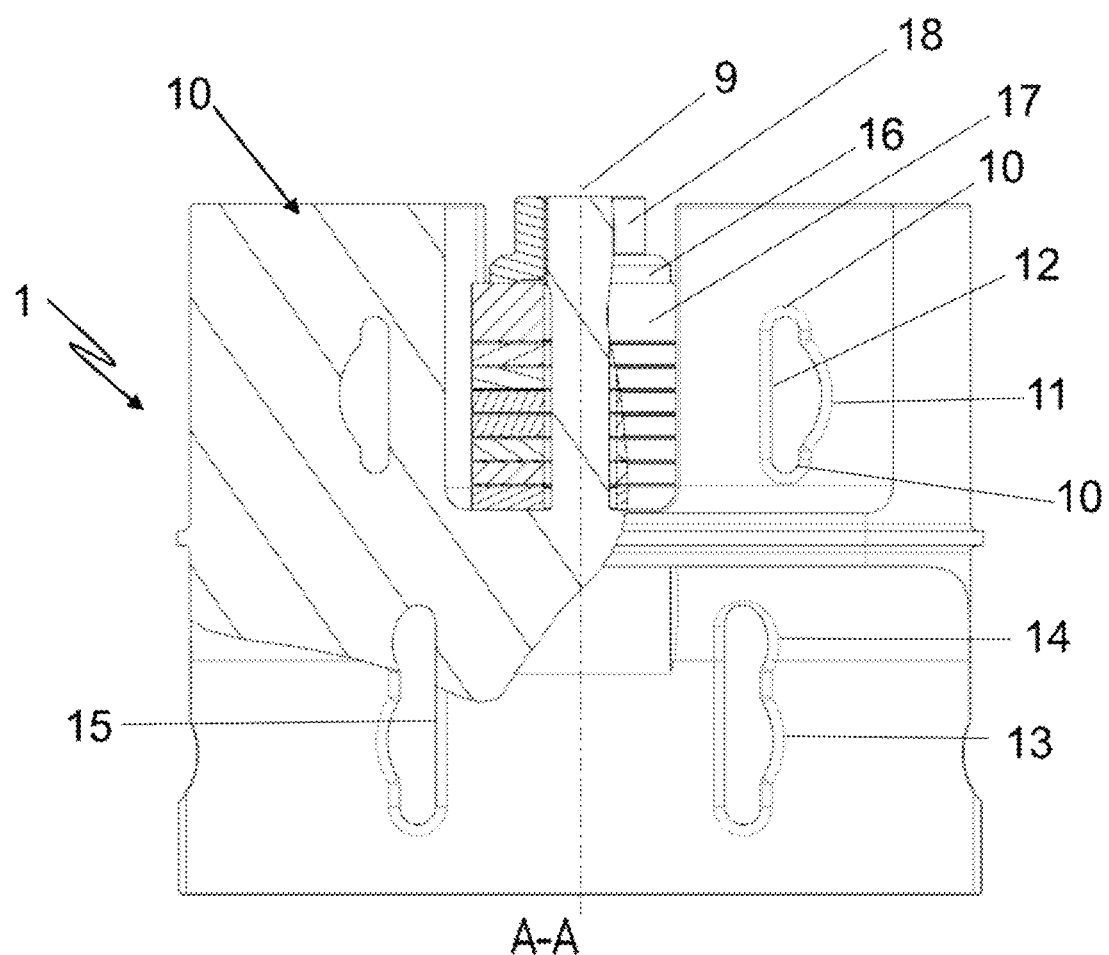

FIG. 1 shows a perspective view of an embodiment of an ultrasonic vibration element 1 according to the invention. A front face 2 designed as a sealing surface 2 can be seen, which is intended to come into contact with a material to be processed. The rear face (not shown in the figure) is arranged opposite the front face 2. The front face 2 and the rear face are connected to each other via a circumferential lateral surface 3.

The ultrasonic vibration element 1 has three sections in the direction of its longitudinal axis 9, namely a first section 6, the thickness of which essentially corresponds to the width of the sealing surface 2, a third section 8, which is designed to be significantly thicker than the first section 6, and a second section 7, the thickness of which varies and which is arranged between the first section 6 and the third section 8.

In this embodiment, the ultrasonic vibration element has a recess in the third section 8, in which a plurality of piezo elements 5 are arranged, with which the ultrasonic vibration element 1 can be set into ultrasonic vibration. The piezo elements 5 have a through opening through which a screw 18 engages in this embodiment. An upper part 17 is pressed against the piezo elements 5 with the aid of a nut 16, so that the piezo elements 5 are held between the upper part 17 and the ultrasonic vibration element 1.

To prevent the mechanical stresses within the material from becoming too great and to optimize the position of unwanted secondary resonances, four slits 4 are provided that completely penetrate the material in a depth direction.

According to the invention, the slits have a special shape. The slits have two cross walls 10 as well as a first longitudinal wall 11 and a second longitudinal wall 12.

The slits extend along a slit longitudinal direction 15, which in the example shown forms an angle of 0° with the longitudinal direction 9 of the ultrasonic vibration element, i.e. runs parallel to it.

The two cross walls 10 of the slits are curved. The second longitudinal wall of the slit 12 is also parallel to the longitudinal axis 9. The longitudinal wall 11 of the slit 4 has a concave curvature.

Basically, the slits according to the invention could be made by first making a slit with two parallel longitudinal walls and then making a corresponding notch in the first wall 11. Several notches 13, 14 can also be made in one of the slits, as can be seen in the two slits 4 arranged closer to the rear face.

REFERENCE SIGNS

1 Ultrasonic vibration element
2 Sealing surface, front face
3 Lateral surface
4 Slit
5 Piezo element
6 First section
7 Second section
8 Third section
9 Longitudinal axis, longitudinal direction
10 Crosswall
11 First longitudinal wall
12 Second longitudinal wall
13, 14 Notch
15 Slit longitudinal direction
16 Nut
17 Upper part
18 Screw

What is claimed is:

1. An ultrasonic vibration element which can be set into resonant vibration with a longitudinal ultrasonic vibration in a longitudinal direction,
    wherein the ultrasonic vibration element is bounded in the longitudinal direction on one hand by a rear face and on another hand by a front face,
    wherein the front face is either intended to come into contact with a further ultrasonic vibration element in order to transmit the ultrasonic vibration to the further ultrasonic vibration element, or is designed as a sealing surface or adjoins a sealing surface which is intended to come into contact with a material to be processed and to transmit the ultrasonic vibration to the material to be processed,
    wherein a circumferential lateral surface is provided, which connects the rear face and the front face to one another,
    wherein the ultrasonic vibration element has a slit in the lateral surface,
    wherein the slit has a slit length l in a slit longitudinal direction, a slit width b in a slit transverse direction and a slit depth t in a slit depth direction, the slit longitudinal direction, the slit transverse direction and the slit depth direction being arranged orthogonally to one another, the slit depth t being selected such that the slit completely penetrates the ultrasonic element, and the slit length l being greater than the slit width b,
    wherein the slit is not axially symmetrical to a slit longitudinal axis along the slit longitudinal direction in a sectional view,
    wherein the slit is bounded by two longitudinal walls and two cross walls, a first of the two longitudinal walls is at least in sections further away from the slit longitudinal axis than a second of the two longitudinal walls, and
    wherein the slit is produced by first producing a slit with two parallel longitudinal walls and then making a recess in the first longitudinal wall.

2. The ultrasonic vibration element according to claim 1, wherein the slit longitudinal direction and the longitudinal direction enclose an angle which is less than 25°, or less than 5°, or 0°.

3. The ultrasonic vibration element according to claim 2, wherein four slits are provided, two of the four slits being arranged axially symmetrically to an axis along the longitudinal direction, and wherein the ultrasonic vibration element has a first, second and third section, the first section having a thickness which is smaller than a thickness of the third section, wherein the second section has a varying thickness and connects the first to the third section.

4. The ultrasonic vibration element according to claim 3, wherein the first section has a sealing surface which is intended to come into contact with a material to be processed, and wherein the third section has a recess in which at least one piezo element is arranged.

5. The ultrasonic vibration element according to claim 4, wherein the first longitudinal wall is arranged further away from a center axis of the ultrasonic vibration element extending in the longitudinal direction than the second longitudinal wall, and wherein the two cross walls are concavely curved.

6. The ultrasonic vibration element according to claim 5, wherein the first longitudinal wall is concavely curved at least in sections.

7. The ultrasonic vibration element according to claim 2, wherein two slits are provided, the two slits being arranged axially symmetrically to an axis along the longitudinal direction.

8. The ultrasonic vibration element according to claim 1, wherein two slits are provided, the two slits being arranged axially symmetrically to an axis along the longitudinal direction.

9. The ultrasonic vibration element according to claim 8, wherein the ultrasonic vibration element has a first, second and third section, the first section having a thickness which is smaller than a thickness of the third section, wherein the second section has a varying thickness and connects the first to the third section.

10. The ultrasonic vibration element according to claim 9, wherein the first section has a sealing surface which is intended to come into contact with a material to be processed.

11. The ultrasonic vibration element according to claim 10, wherein the third section has a recess in which at least one piezo element is arranged.

12. The ultrasonic vibration element according to claim 9, wherein the third section has a recess in which at least one piezo element is arranged.

13. The ultrasonic vibration element according to claim 8, wherein four slits are provided, two of the four slits being arranged axially symmetrically to an axis along the longitudinal direction.

14. The ultrasonic vibration element according to claim 13, wherein the ultrasonic vibration element has a first, second and third section, the first section having a thickness which is smaller than a thickness of the third section, wherein the second section has a varying thickness and connects the first to the third section.

15. The ultrasonic vibration element according to claim 1, wherein the first longitudinal wall is arranged further away from a center axis of the ultrasonic vibration element extending in the longitudinal direction than the second longitudinal wall.

16. The ultrasonic vibration element according to claim 15, wherein the two cross walls are concavely curved.

17. The ultrasonic vibration element according to 16, wherein the first longitudinal wall is concavely curved at least in sections.

18. The ultrasonic vibration element according to claim 16, wherein the two cross walls are curved with the same radius of curvature.

19. The ultrasonic vibration element according to 15, wherein the first longitudinal wall is concavely curved at least in sections.

20. An ultrasonic vibration element which can be set into resonant vibration with a longitudinal ultrasonic vibration in a longitudinal direction,
wherein the ultrasonic vibration element is bounded in the longitudinal direction on one hand by a rear face and on another hand by a front face,
wherein the front face is either intended to come into contact with a further ultrasonic vibration element in order to transmit the ultrasonic vibration to the further ultrasonic vibration element, or is designed as a sealing surface or adjoins a sealing surface which is intended to come into contact with a material to be processed and to transmit the ultrasonic vibration to the material to be processed,
wherein a circumferential lateral surface is provided, which connects the rear face and the front face to one another,
wherein the ultrasonic vibration element has a slit in the lateral surface,
wherein the slit has a slit length l in a slit longitudinal direction, a slit width b in a slit transverse direction and a slit depth t in a slit depth direction, the slit longitudinal direction, the slit transverse direction and the slit depth direction being arranged orthogonally to one another, the slit depth t being selected such that the slit completely penetrates the ultrasonic element, and the slit length l being greater than the slit width b,
wherein the slit is not axially symmetrical to a slit longitudinal axis along the slit longitudinal direction in a sectional view, and
wherein the slit is bounded by two longitudinal walls and two cross walls, wherein the two longitudinal walls are parallel to each other, and a first of the two longitudinal walls has a recess that is located further away from the slit longitudinal axis than a second of the two longitudinal walls.

* * * * *